(12) United States Patent
Grochowicz et al.

(10) Patent No.: US 12,145,580 B2
(45) Date of Patent: Nov. 19, 2024

(54) METHOD FOR DETECTING A POTENTIAL COLLISION BY A VEHICLE WITH A LIVING THING, AND CAR PARK MANAGEMENT SYSTEM

(71) Applicant: Volkswagen Aktiengesellschaft, Wolfsburg (DE)

(72) Inventors: Jakub Mateusz Grochowicz, Essen (DE); Dorian Müller, Ilmenau (DE); Bastian Göricke, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 394 days.

(21) Appl. No.: 17/610,506

(22) PCT Filed: Apr. 28, 2020

(86) PCT No.: PCT/EP2020/061799
§ 371 (c)(1),
(2) Date: Nov. 11, 2021

(87) PCT Pub. No.: WO2020/229168
PCT Pub. Date: Nov. 19, 2020

(65) Prior Publication Data
US 2022/0219687 A1    Jul. 14, 2022

(30) Foreign Application Priority Data
May 14, 2019    (DE) .................... 10 2019 206 945.2

(51) Int. Cl.
*B60W 30/095*    (2012.01)
*B60W 30/06*    (2006.01)
(Continued)

(52) U.S. Cl.
CPC ........ *B60W 30/0956* (2013.01); *B60W 30/06* (2013.01); *B60W 30/0953* (2013.01);
(Continued)

(58) Field of Classification Search
CPC ............ B60W 30/0956; B60W 30/06; B60W 30/0953; B60W 2420/403;
(Continued)

(56) References Cited

U.S. PATENT DOCUMENTS 7,119,681 B2 * 10/2006 Eskildsen .............. G08B 13/08
340/545.8
10,847,027 B1 * 11/2020 Baker .................... G06Q 50/22
(Continued)

FOREIGN PATENT DOCUMENTS

CN    103558856 A    2/2014    ............... G05D 1/02
CN    105984448 A    10/2016    ............... B60Q 9/00
(Continued)

OTHER PUBLICATIONS

German Office Action, Application No. 102019206945.2, 7 pages, Feb. 5, 2020.
(Continued)

*Primary Examiner* — Sohana Tanju Khayer
(74) *Attorney, Agent, or Firm* — Slayden Grubert Beard PLLC

(57) ABSTRACT

The invention relates to a method for recognizing a potential collision of a vehicle with a living creature, wherein at least one operating state is monitored of a functional unit in a parking garage in which the vehicle is located, wherein when such a characteristic operating state of the functional unit is recognized by a monitoring device that characterizes a direct, potential appearance of a living creature in the parking garage, a notice is transmitted to the vehicle, and/or
(Continued)

an operating mode of the vehicle is changed. The invention also relates to a parking garage management system.

15 Claims, 1 Drawing Sheet

(51) Int. Cl.
*B60W 50/00* (2006.01)
*G08G 1/14* (2006.01)
*G08G 1/16* (2006.01)

(52) U.S. Cl.
CPC ......... *B60W 50/0097* (2013.01); *G08G 1/146* (2013.01); *G08G 1/148* (2013.01); *B60W 2420/403* (2013.01); *B60W 2540/01* (2020.02); *B60W 2540/043* (2020.02); *B60W 2554/4029* (2020.02); *G08G 1/166* (2013.01)

(58) Field of Classification Search
CPC ....... B60W 2540/01; B60W 2540/043; B60W 2554/4029; B60W 50/0097; G08G 1/146; G08G 1/148; G08G 1/166; G08G 1/164; G08G 1/165; G08G 1/14; B62D 15/0285; E04H 6/422; E04H 6/426
See application file for complete search history.

(56) References Cited

U.S. PATENT DOCUMENTS

| | | | |
|---|---|---|---|
| 2009/0028674 A1* | 1/2009 | Woo ..................... | E04H 1/04 414/228 |
| 2012/0065858 A1 | 3/2012 | Nickolaou et al. ............. | 701/70 |
| 2014/0046506 A1* | 2/2014 | Reichel ............. | B62D 15/0285 701/2 |
| 2014/0218527 A1* | 8/2014 | Subramanya .......... | G08G 1/146 348/148 |
| 2015/0353080 A1* | 12/2015 | Mukaiyama ............ | E05B 77/54 701/23 |
| 2016/0272172 A1 | 9/2016 | Lee ................................. | 701/70 |
| 2017/0254654 A1 | 9/2017 | Nordbruch | |
| 2018/0204452 A1 | 7/2018 | Auracher et al. | |
| 2018/0286249 A1 | 10/2018 | Nordbruch | |
| 2018/0304887 A1 | 10/2018 | Nordbruch | |
| 2018/0341257 A1 | 11/2018 | Nordbruch et al. | |
| 2019/0071069 A1 | 3/2019 | Nordbruch | |
| 2019/0204844 A1* | 7/2019 | Lau ...................... | G05D 1/0274 |
| 2020/0262418 A1 | 8/2020 | Lin | |
| 2021/0173400 A1 | 6/2021 | Hasegawa et al. | |

FOREIGN PATENT DOCUMENTS

| | | | |
|---|---|---|---|
| CN | 107003674 A | 8/2017 | ............... G05D 1/02 |
| CN | 107564334 A | 1/2018 | ............... G08G 1/16 |
| CN | 107808549 A | 3/2018 | ............... G08G 1/16 |
| CN | 108140326 A | 6/2018 | ............ B60W 30/09 |
| CN | 108674413 A | 10/2018 | .......... B60W 30/095 |
| DE | 102007052667 A1 | 5/2009 | ............. G07C 5/08 |
| DE | 102011082325 A1 | 3/2012 | ............ B60Q 9/00 |
| DE | 102014219388 A1 | 3/2016 | ............ B60W 30/08 |
| DE | 102016215478 A1 | 2/2018 | ............ B60Q 9/00 |
| DE | 102017200727 A1 | 7/2018 | ............. G08B 21/00 |
| DE | 102019206945 A1 | 11/2020 | ............. B60R 16/02 |
| EP | 1775692 A2 | 4/2007 | ............... E04H 6/42 |
| EP | 3580737 A1 * | 12/2019 | ............ E04H 6/422 |
| FR | 3028999 A1 | 5/2016 | ............... G08G 1/16 |
| JP | 2012155522 A | 8/2012 | ............... G08G 1/16 |
| WO | 2018/167891 A1 | 9/2018 | ............ B60R 21/00 |
| WO | 2020/229168 A1 | 11/2020 | ............. B62D 15/02 |

OTHER PUBLICATIONS

International Search Report and Written Opinion, Application No. PCT/EP2020/061799, 8 pages, Aug. 26, 2020.

* cited by examiner

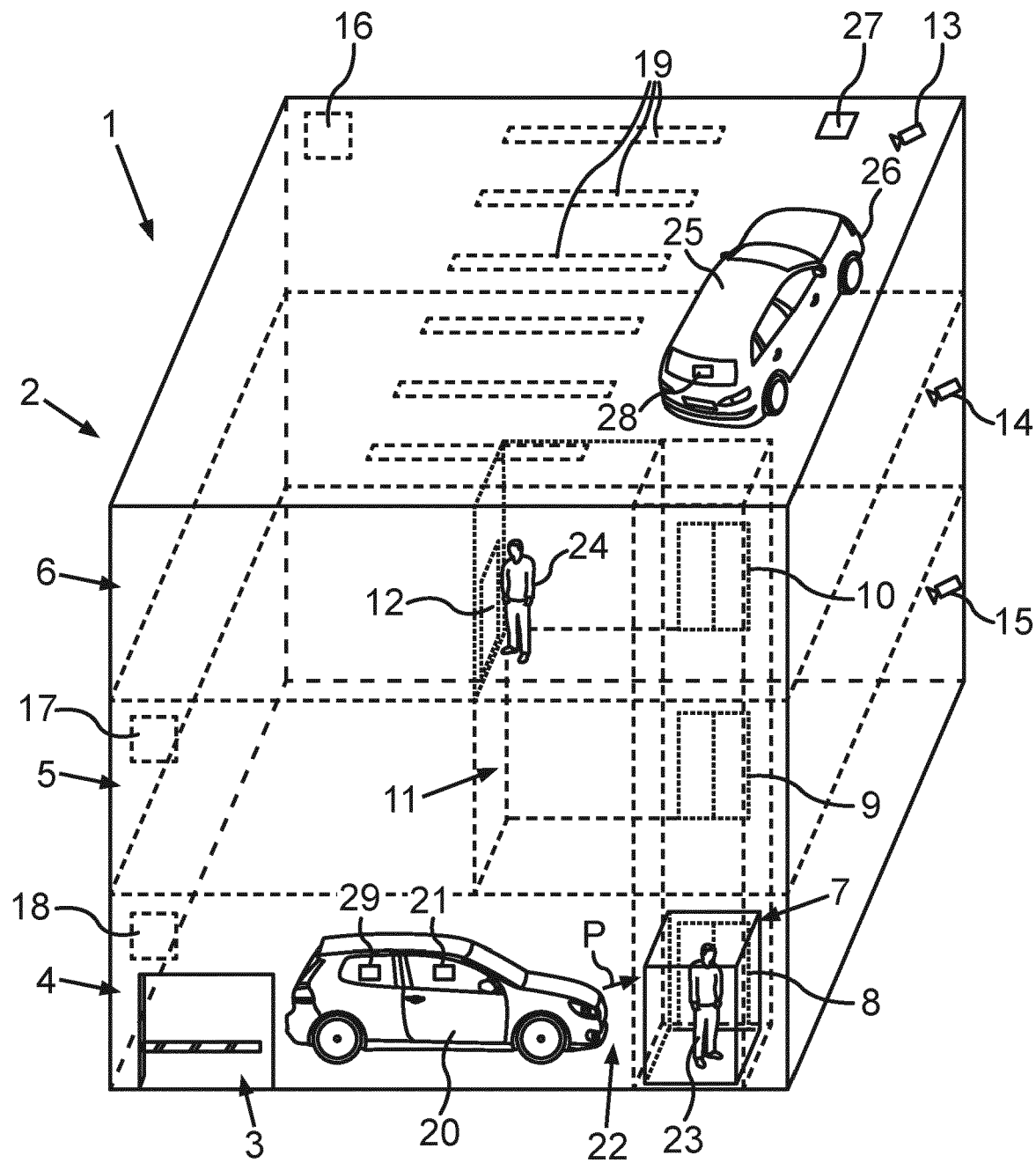

METHOD FOR DETECTING A POTENTIAL COLLISION BY A VEHICLE WITH A LIVING THING, AND CAR PARK MANAGEMENT SYSTEM

CROSS-REFERENCE TO RELATED APPLICATIONS

This application claims priority to German Patent Application No. DE 10 2019 206 945.2, filed on May 14, 2019 with the German Patent and Trademark Office. The contents of the aforesaid Patent Applications are incorporated herein for all purposes.

TECHNICAL FIELD

The invention relates to a method for recognizing a potential collision of a vehicle with a living creature. The invention also relates to a parking garage management system.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern driver assistance systems that are installed in the vehicle itself are capable of directly detecting objects in the environment of the motor vehicle and also recognizing living creatures in this context. This may for example be done using a camera of the motor vehicle.

Moreover, an information exchange between several vehicles is enabled to generally prevent a collision with a vehicle door. It may also be provided that an observation apparatus detects the vehicle with the vehicle door to be protected or an approaching vehicle, and then a corresponding message is fed to the vehicle ad hoc network which then warns either the vehicle with the vehicle door to be protected and/or the approaching vehicle. In this context, it is also possible for pedestrians to be included by the observation apparatus.

Independent of these explained scenarios, individual situations may arise for a vehicle in which a potential collision with living creatures is possible, wherein in this regard, living creatures may be unexpected at specific locations.

SUMMARY

A need exists to create a method as well as a parking garage management system in which a collision with living creatures in a parking garage may be better avoided.

This need is addressed by a method and a parking garage management system according to the independent claims. Embodiments of the invention are described in the dependent claims, the following description, and the drawings.

BRIEF DESCRIPTION OF THE DRAWINGS

The only FIG. shows a schematic representation of a parking garage.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A first exemplary aspect relates to a method for recognizing a potential collision of a vehicle with a living creature. At least one operating state of a functional unit in a parking garage in which the vehicle is located is monitored. When such a characteristic operating state of the functional unit is recognized by a monitoring device that characterizes a direct, potential and therefore possible appearance of a living creature in the parking garage, a notice is transmitted to the vehicle, and/or an operating mode of the vehicle is changed. Operational safety in a parking garage is increased by such a procedure.

Particularly in a parking garage in which a wide variety of situations may occur with respect to appearing living creatures, it is therefore possible to recognize that at least one living creature may appear in the parking garage in the foreseeable future or immediately afterward by using very specific criteria, i.e., recognized characteristic operating states of at least one technical functional unit of a parking garage. Because of such a characteristic operating state of at least one functional unit of the parking garage itself that therefore permanently belongs to the parking garage, a certain probability and therefore an assumption may exist that a living creature is located in the parking garage, or respectively is or will appear at a specific location in the parking garage. A characteristic operating state indirectly indicates a potential presence of a living creature, even if the living creature is not yet present and/or detectable. In such a scenario, it is therefore also possible to nonetheless already be able to infer that such a living creature will at least possibly appear at a specific location when the living creature is not yet at a specific location in the parking garage and is perhaps also not yet recognized, in particular not yet recognized by the vehicle. As a result, this may now be reacted to by the present aspect. In particular to accomplish this, a notice may be transmitted to the vehicle, and/or an operating mode of the vehicle may be changed. This change may also be carried out independently by the vehicle itself. A living creature may for example be a human such as for example a child, or an older person, or an adult. A living creature may however also be an animal. With this embodiment, it is therefore possible to better prevent a potential collision with living creatures, particularly in parking garages.

An embodiment provides that the current position of the vehicle is transmitted to a parking garage management system of the parking garage. The notice is transmitted to the vehicle when the functional unit of the parking garage is in the area of the current position of the vehicle, and/or a potential appearance of a living creature is expected in the area of the current position. This expectation may be directly afterward, or exist within a specific interval of time. Particularly when it is recognized that a living creature might appear directly at such a location at which a vehicle is currently located or immediately in front, there may be a corresponding transmission of a notice and/or a change in the mode of operation of the vehicle. This allows a potential collision to be prevented in advance. With this embodiment, it is therefore intelligently checked whether a potential living creature is not located somewhere in the parking garage where an uncritical situation with the vehicle cannot even occur, and therefore a potential collision is impossible. By means of this embodiment, it is therefore checked where such a living creature could be, or in all likelihood could be within a certain time window depending on the current point in time, and whether this then corresponds to the current position of the vehicle so that a potential collision might actually occur. With such an embodiment, in particular only those scenarios are considered that may also in fact lead to a potential collision. This prevents unnecessary overloading with notices that are not needed. This may also prevent unnecessarily changing an operating mode of the vehicle.

It is for example provided that, depending on the characteristic operating state of the functional unit, a point in time for a potential arrival of a living creature at the current position is estimated, in particular by the parking garage management system and, depending on the current operating mode of the vehicle, it is determined whether the vehicle will also be located in a collision-critical area around the current position at the estimated point in time. This is another beneficial embodiment since an evaluation, or respectively assessment may also proactively occur in the context for future potential collisions, and then there is a corresponding notice and/or a change in the mode of operation. A staggered scenario may also occur in the context. In the context, a notice may for example already be immediately sent that a potential collision with a living creature might arise, possibly due to the current conditions within a possible time interval X. Afterward, there may also be an actual change in the mode of operation of the vehicle, in particular when the potential collision is monitored further, and a possible location of appearance of a living creature, and moreover an actual appearance, is also assessed depending on the characteristic operating state of the at least one functional unit.

With such a procedure, the evaluation of a potential collision is on the one hand carried out even more precisely and as needed. Accordingly, actual potential collisions may be better taken into account, and it may be decided with greater precision whether and possibly when to output a notice, and/or whether and possibly when to change the operating mode of the motor vehicle. This is in particular beneficial when potential collisions are not immediately expected but rather may occur at a delay from the actual point in time within a certain time window.

One embodiment provides that an image is shown in a display unit of the vehicle in which the parking garage is at least regionally shown. It may in particular be provided that the current position of the vehicle and/or a location at which a potential collision with a living creature might occur are displayed in this image. In an embodiment, it may be provided that a distance between the vehicle and the potential collision location is shown in this image. This may also be shown dynamically changed. In particular in the context, a driving trajectory of the vehicle in the parking garage may also be shown in such an image. In particular, this may be the driving trajectory that leads to a potential parking zone. In particular, the location at which the potential collision could occur viewed along this driving trajectory may then also be recognized in the context. In particular by such an embodiment, a better intuitive understanding of where a potential collision location might be may be conveyed to the vehicle user.

Unexpected collision sites with living creatures may therefore be better tracked and more easily understood and avoided, in particular in parking garages in which the hidden and/or unclear areas are normally formed by parked cars, and/or walls, and/or entrances and exits, and/or staircases, and/or elevators, and/or a wide variety of meandering, given lanes and/or helical winding lanes to reach another level of the parking garage.

For example it is provided that a future position of the vehicle in the parking garage is estimated, in particular depending on vehicle information that is current and/or to be expected in the future, and is transmitted to a parking garage management system of the vehicle. The notice is transmitted to the vehicle when the functional unit is in the area of the future position, and/or a potential appearance of a living creature is expected in the area of the future position, or respectively location of the vehicle. In the context, it may also be provided that a point in time for a potential arrival of a living creature at this future position of the vehicle is estimated depending on the characteristic operating state of the functional unit, and it is determined whether the vehicle is located in the future position at the estimated point in time depending on the current mode of operation of the vehicle and the mode of operation of the vehicle to be expected in the future.

An embodiment provides that an elevator in the parking garage is monitored as the functional unit, in particular with the monitoring device. A characteristic operating state of this elevator is moving and stopping, in particular on a level on which the vehicle is currently located and/or is to be expected in the future. If such a specific characteristic operating state of the elevator is recognized, a potential collision of a living creature with the vehicle may occur. This information on the elevator as to when it is moving, and where it is moving, and to which level it is moving, may be administered by the parking garage management system. On the basis of this information, it may then also be determined when the elevator reaches the entrance and/or exit point on the particular level, and the time at which a living creature accordingly possibly might therefore exit the elevator on the specific level. If this point in time and the relevant location are the time at which and the location at which the vehicle is then located, a potential collision situation may be recognized by the parking garage management system. In particular, at least one notice may then be transmitted to the vehicle in such scenarios, and/or an operating mode of the vehicle may be changed.

In some embodiments, this situation relates to an elevator whose entrance and/or exit is in the area of the current position of the vehicle and/or a future position of the vehicle to be expected. Particularly when living creatures exit directly when the elevator door is opened and in particular possibly without considering the situation in the parking garage, a collision may occur with an approaching vehicle, which is avoided by the embodiments.

An embodiment provides that an electrically opening door in the parking garage is monitored as a functional unit. Opening, in particular on a level on which the vehicle is currently located and/or is to be expected in the future is evaluated and correspondingly recognized as a characteristic operating state of this electrically opening door. An electrically opening door is in particular one that opens automatically when a living creature is located in direct proximity. In particular, the door opens without a living creature itself having to grab the door and for example open it with a door handle. An electrically opening door is in particular one wherein, for example, a living creature approaching the door is recognized by a motion detector and, in this regard, the door then opens early and before the living creature reaches the door. Moreover, such an electrically opening door may also be opened by an opening switch that is arranged outside the door, for example fastened to a wall at some distance from the door, and that may be actuated by a user, or respectively a living creature. In context, an automatic opening of the door also occurs before a living creature is located directly and immediately at the door. Even if a living creature is not yet recognized and detected, such an opening of the door also indicates with a strong probability that an appearance of a living creature will occur, in particular directly. If such an opening of a door is recognized, a potential collision with a vehicle may also be inferred through the parking garage management system when a vehicle is then located at this current position in the area of the opening door.

In another embodiment, it may be provided that a motion detector is monitored as a functional unit, in particular on a level on which the vehicle is currently located and/or will be expected in the future. If a motion detector is triggered, or respectively a living creature is moving within its detection area, this living creature is correspondingly detected. In particular, there is further action based on this detection by the motion detector. Depending thereupon, in particular lighting of the parking garage may for example be turned on on a particular level or in a particular area. Accordingly, based on the detection by a motion detector and/or the action resulting therefrom in which an operating state of an additional functional unit of the parking garage is changed, a living creature may be inferred that is located in the area of the motion detectors, or directly, or within a specific determinable interval of time in the future, at a location in the parking garage in which this activated functional unit is located. This allows a potential appearance of the living creature in this location, or respectively in this area of the parking garage, to be inferred. If, at this point in time, the vehicle is then also in this area of the motion detector and/or in the area in which an operating mode of another functional unit of the parking garage is changed by the information of the motion detector, a potential collision situation of the vehicle with a potential living creature may be inferred. In context, there may then be a notice for the vehicle and/or a change in the mode of operation of the vehicle as needed.

An embodiment provides that an electrical occupancy sensor of the parking zone in the parking garage is monitored as a functional unit. As a characteristic operating status of this occupancy sensor, an occupancy signal currently being generated by this occupancy sensor, in particular on a level in which the vehicle is currently located and/or is expected in the future, is recognized. In particular in context, a current, or respectively present occupation of a parking zone with a vehicle is detected. Since particularly in such scenarios, an exit of a living creature from this vehicle parked in the parking zone is expected directly afterward, or following within a short time interval after this occupancy, collision situations may occur in this regard as well. If the vehicle is located in the area of this parking zone in which the other vehicle was immediately parked, a potential collision situation may arise due to an anticipated exit of a living creature from the parked vehicle and the approaching other vehicle. This as well is detected, evaluated and assessed and, if applicable, a notice to the vehicle and/or a change in the mode of operation of the vehicle is executed.

In one embodiment, it may be provided that an optical detection apparatus, in particular a camera, of the parking garage directly detects a living creature and, depending thereupon, a notice is transmitted to the vehicle, and/or a detection unit of another vehicle in the parking garage directly detects a living creature, and a characteristic operating state of a functional unit of the parking garage is detected by a detection unit of another vehicle in the parking garage and, depending thereupon, a notice is transmitted to the vehicle that might collide with a living creature.

For example it may be provided that the at least one monitoring device with which at least one functional unit is monitored is arranged outside the vehicle that might experience the potential collision with a living creature. This monitoring device is arranged in the parking garage. A monitoring device may also be arranged on a vehicle. In particular, this may be the vehicle that would be involved in a potential collision with a living creature in the parking garage.

Another exemplary aspect relates to a parking garage management system with at least one functional unit and one vehicle. The parking garage management system is designed to perform a method according to the aforementioned exemplary aspect or an embodiment thereof. In particular, the method is performed by the parking garage management system. The parking garage management system may have at least one control unit. It may have at least one memory unit. For example, the parking garage management system may also have an evaluation unit. The parking garage management system for example has a computer program. This computer program has commands that, when they are saved on a computer, in particular a control unit, may perform a method according to the aforementioned exemplary aspect or an embodiment thereof.

A collision evaluation method for a parking garage is also provided by the aforementioned features of the present aspect.

A specific steering maneuver and/or a change in speed may be provided as the change in an operating mode of the vehicle. In particular, this may occur as information to a vehicle driver who manually maneuvers the vehicle. With an autonomous vehicle, these changes in the mode of operation may be performed by the vehicle itself.

The invention also includes combinations of the features of the described embodiments.

In the following, further exemplary embodiments are described. In this regard, the individual FIG. shows a schematic representation of a parking garage.

In the exemplary embodiments described herein, the described components of the embodiments each represent individual features that are to be considered independent of one another, in the combination as shown or described, and in combinations other than shown or described. In addition, the described embodiments can also be supplemented by features of the invention other than those described.

Specific references to components, process steps, and other elements are not intended to be limiting. It is further noted that the FIG. is schematic and provided for guidance to the skilled reader and are not necessarily drawn to scale. Rather, the various drawing scales, aspect ratios, and numbers of components shown in the FIG. may be purposely distorted to make certain features or relationships easier to understand.

The only FIG. shows a schematic representation of a parking garage 1. The parking garage 1 has a parking garage management system 2. Potential collision situations between a vehicle in the parking garage and a living creature in the parking garage may at least be reduced by the electronic parking garage management system.

The parking garage 1 has an entrance 3 by means of which vehicles may enter and/or exit the parking garage 1. The parking garage 1 has for example a first level 4 which is a first floor. Moreover, the parking garage 1 has for example a second level 5 and a third level 6. Vehicles may be parked on all levels 4 to 6. For this purpose, given parking zones are formed.

Moreover, the parking garage 1 has at least one elevator 7. On the different levels 4 to 6, entrances and/or exits 8, 9 and 10 are formed in the elevator 7. In addition, the parking garage 1 also has for example a staircase 11. This also has doors on different levels from which one may enter the parking areas of the particular levels 4 to 6 from the staircase 11, or out of which one may leave them. For example, a door 12 is shown in the FIG. on the level 6. This is in particular an electrically opening door.

In addition, the parking garage 1 has at least one monitoring device 13. A monitoring device 13, 14, 15 may be arranged on any level. Several monitoring devices may also be provided. The elevator 7 and the door 12 are technical functional units of the parking garage 1. Another technical functional unit may for example be at least one motion detector 16. Several motion detectors 16, 17, 18 may be provided. These motion detectors are also functional units of the parking garage 1. Another technical functional unit may for example be a lighting device 19, of which in this case only a few of the light sources are provided with reference numbers. In particular, the lighting device may be operated automatically. For example, this may be the case in that, when a living creature enters the parking area of a level 4 to 6, the lighting device 19 is automatically activated. This may for example be the case depending on a recognition of such an entrance of a living creature by a motion detector 16 to 18. It is provided that at least one operating state of at least one of the aforementioned functional units is monitored in the parking garage 1 in which the vehicle 20 is located. When a characteristic operating state of the functional unit is recognized by at least one monitoring device 13 to 15 and/or by a monitoring device 21 of the vehicle 2 that characterizes an immediate potential appearance of a living creature in the parking garage 1, in particular in the area in which the vehicles may move and in which they may be parked, a notice is transmitted to the vehicle 20, and/or a mode of operation of the vehicle 20 is changed. This may be evaluated and controlled by a control unit 29 of the vehicle 20.

Consequently, a collision of the vehicle 20 which is located in the parking garage 1, which is still moving or will be subsequently moving, with such a living creature is avoided. The procedure therefore makes it possible, using operating states of functional units, to enable an evaluation of whether a living creature will appear in a specific area of the parking garage 1. Without the potential living creature already being directly detected, or respectively recognized, the method therefore makes it possible to evaluate whether the appearance of a living creature must be anticipated. These characteristic operating states are specific in that they are triggered by a living creature, and/or may only be triggered by a living creature. These characteristic operating states of the functional units therefore represent criteria that indicate with a high probability or with certainty that at least one living creature is present, or will be present in the near future.

It may be provided that the current position 22 of the vehicle 20 is transmitted to the parking garage management system 2, and a notice is transmitted to the vehicle 20 when the functional unit is in the area of the current position 22, and/or a potential appearance of a living creature is expected in the area of the current position 22. This may accordingly be the case in the FIG. when a person 23 exits the elevator 7 on the level 4. For example, the characteristic operating state is recognized in that the elevator 7 is traveling or has traveled downward from the level 6 or the level 5, and an exit from the elevator 7 at the entrance and/or exit point 8 is directly pending. Since the vehicle 20 is located in the area of the elevator 7, in particular of the entrance and/or exit 8 into/out of the level 4, a collision between the vehicle 20 that is moving in the direction of the arrow P with this living creature 23 could occur when the living creature 23, that in this case is a person, exits.

It may be provided that, depending on the characteristic operating state of the functional unit, in this case the elevator 7, a point in time for a potential arrival of the living creature 23 at the current position is estimated and, depending on the current operating mode of the vehicle 20, it is determined whether the vehicle 20 will also be located in a collision-critical area around the current position 22 at the estimated point in time. The notice to the vehicle 20 and/or the change in the operating mode of the vehicle 20 occurs if the vehicle 20 would still be in this area at the estimated point in time. The same may also occur for a position of the vehicle 20 in the parking garage 1 to be expected in the future. This may be estimated depending on vehicle information that is current and/or to be expected in the future.

Likewise in addition or instead, if the vehicle 20 would for example be on the level 6, an opening of the door 20 may be detected as a characteristic operating state. It could then be inferred that a living creature 24 is entering through the door 12 into the area of the parking garage on the level 6 on which vehicles are moving and/or parked. In this case as well, a corresponding scenario as was explained above with respect to the living creature 23 in the elevator 7 may then occur. When the living creature 24 enters the level 6 and the door 12 is automatically opened directly beforehand, it is also possible for this to be detected by the motion detector 16. Likewise it may be provided that, depending on an entrance of the living creature 24 into this area of the parking garage 1, a lighting device 19 is automatically activated, and this characteristic operating state of the functional unit 19, i.e., the change from the deactivated state to the activated state, is detected, and an immediately pending appearance of the living creature 24 is inferred therefrom. Even when the vehicle 20 is located on the level 6 in the area of the staircase 11 and therefore in the area of the door 12, a potential collision with the possibly entering living creature 24 may also be assumed. Then as well, there may be a corresponding notice to the vehicle 20 and/or a change in the operating mode of the vehicle 20.

In another example, it may be provided that another vehicle 25 is present in the parking garage 1. It may be provided that the vehicle 25 has just parked in a parking zone 26. This may be detected by a movement sensor 27 of this parking zone 26. In this case, an occupied signal is generated that represents the immediate change from the free state to the occupied state. This information may be transmitted to the parking garage management system 2. Since, in such a situation, an immediately pending exit by a living creature from the other vehicle 25 is anticipated, there may be a notice to the vehicle 20 and/or a change in the mode of operation of the vehicle 20 when the vehicle 20 is located on the level 6 and in particular approaches the vehicle 25 on a lane. Accordingly, a potential collision by a living creature that is located in the vehicle 25 and the vehicle 20 may be avoided, particularly when the living creature of the other vehicle 25 exits therefrom and then would possibly enter the level 6 on the lane adjacent to the parking zone 26.

Particularly in a parking garage in which, very often, due to the conditions, an angular structure prevails and unclear conditions prevail in this respect, improved avoidance of a collision by a vehicle and a living creature may be achieved by the proposed method and the proposed parking garage management system. This may be achieved both with vehicles that are manually controlled by a driver, as well as with at least partially, in particular fully, autonomously driving vehicles. Potential collision scenarios may be recognized early on, even when the potential living creature that would be part of the potential collision was also not yet recognized and not yet directly detected by the vehicle itself.

It is also possible for the vehicle 20 to detect the environment in the vehicle with the monitoring device 21, and in this respect may also detect such characteristic operating states of the functional units. In addition to or instead of this, it is also possible for an additional vehicle, such as the vehicle 25 in the parking garage 1, to be able to detect the environment with a vehicle-internal monitoring device 28, and in this respect also be able to detect characteristic operating states of functional units. This information may be transmitted to the vehicle 20 and/or to the parking garage management system 2 by the vehicle 25.

A change in the operating mode of the vehicle may be an execution of a steering maneuver, or a preparation to execute a steering maneuver. In addition or instead of this, a speed change, in particular a braking, may be carried out, or a preparation for such a speed change operation. It may be provided that even if the vehicle 20 is manually maneuvered by a driver, an automatic intervention by an electronic vehicle guidance system of the vehicle 20 still occurs when a required reaction by the driver does not occur. It may be provided that the parking garage 1, and therefore the parking garage management system 2 as well, only transmit the raw data from the functional units such as the elevator 7, and/or the electronically openable door 12, and/or the motion detectors 16 to 18, and/or the lighting device 19, to the vehicle 20. This raw data is then further processed by a control unit 29 of the vehicle 20 itself. It may also be provided that this processing of the raw data is carried out by the parking garage management system 2. With such an embodiment, the already processed data is then transmitted to the vehicle 20.

A parking garage management system is also to be understood as a system with which vehicles may be parked in specific parking zones provided therefor. In context, a parking garage therefore does not necessarily have to be an enclosed building. In context, it may also be a delimited parking area only located on one level that has additional, specific objective functional units which may assume characteristic operating states that indicate a presence of a living creature in the area of the functional unit. For example, a parking garage is however a building with at least one level that is delimited by walls so that in this respect, for example, an elevator 7, and/or a staircase 11, and/or an electrically opening door 12, and/or a lighting device 19, and/or motion detector 16 to 18, and/or emergency exits and the like are present.

LIST OF REFERENCE NUMERALS

1 Parking garage
2 Parking garage management system
3 Entrance
4 First level
5 Second level
6 Third level
7 Elevator
8 Entrance and/or exit
9 Entrance and/or exit
10 Entrance and/or exit
11 Staircase
12 Door
13 Monitoring device
14 Monitoring device
15 Monitoring device
16 Motion detector
17 Motion detector
18 Motion detector
19 Lighting device
20 Vehicle
21 Monitoring device
22 Position
23 Living creature
24 Living creature
25 Vehicle
26 Parking zone
27 Movement sensor
28 Monitoring device
29 Control unit The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for recognizing a potential collision of a vehicle with a living creature, comprising:
monitoring at least one operating state of at least one elevator in a parking garage in which the vehicle is located;
determining a movement, in particular on a level on which the vehicle is currently located and/or is to be expected in the future, as a characteristic operating state of the elevator that characterizes a potential appearance of the living creature in the parking garage;
when the characteristic operating state is determined, conducting one or more of transmitting a notice to the vehicle, and changing an operating mode of the vehicle;
transmitting a current position of the vehicle to a parking garage management system;

transmitting the notice to the vehicle when the elevator is in an area of the current position, and/or the potential appearance of the living creature is expected in the area of the current position;
depending on the characteristic operating state of the elevator, estimating a point in time for a potential arrival of the living creature at the current position; and
depending on the operating mode of the vehicle, determining whether the vehicle will still be located in a collision-critical area around the current position at the estimated point in time, wherein the notice is then transmitted and/or the operating mode of the vehicle is changed if the vehicle would still be in this area at the estimated point in time.

2. The method of claim 1, comprising:
estimating a future position of the vehicle in the parking garage, in particular depending on vehicle information; and
transmitting the future position to a parking garage management system, wherein the notice is transmitted to the vehicle when the elevator is in an area of the future position, and/or the potential appearance of the living creature is expected in the area of the future position.

3. The method of claim 1, comprising:
monitoring a motion detector located on a level of the parking garage on which the vehicle is currently located and/or is to be expected in the future.

4. The method of claim 1, comprising:
monitoring an occupancy sensor located in a parking zone on a level of the parking garage; and
recognizing an occupied signal currently being generated by this occupancy sensor as a characteristic operating state of the occupancy sensor, in particular on a level on which the vehicle is currently located and/or is to be expected in the future.

5. The method of claim 1, comprising:
detecting the living creature using a camera of the parking garage; and depending thereupon, transmitting the notice to the vehicle; and/or detecting the living creature by another vehicle in the parking garage, or detecting the characteristic operating state of the elevator of the parking garage by the another vehicle in the parking garage and, depending thereupon, transmitting the notice to the vehicle, and/or changing an operating mode of the vehicle.

6. A parking garage management system with a vehicle, wherein the parking garage management system is configured for:
monitoring at least one operating state of an elevator in a parking garage in which the vehicle is located;
determining a movement, in particular on a level on which the vehicle is currently located and/or is to be expected in the future, as a characteristic operating state of the elevator that characterizes a potential appearance of a living creature in the parking garage;
when the characteristic operating state is determined, conducting one or more of transmitting a notice to the vehicle, and changing an operating mode of the vehicle;
transmitting a current position of the vehicle to a parking garage management system;
transmitting the notice to the vehicle when the elevator is in an area of the current position, and/or the potential appearance of the living creature is expected in the area of the current position;
depending on the characteristic operating state of the elevator, estimating a point in time for a potential arrival of the living creature at the current position; and
depending on the operating mode of the vehicle, determining whether the vehicle will still be located in a collision-critical area around the current position at the estimated point in time, wherein the notice is then transmitted and/or the operating mode of the vehicle is changed if the vehicle would still be in this area at the estimated point in time.

7. The method of claim 1, comprising:
estimating a future position of the vehicle in the parking garage, in particular depending on vehicle information; and
transmitting the future position to a parking garage management system, wherein the notice is transmitted to the vehicle when the elevator is in the area of the future position, and/or the potential appearance of the living creature is expected in the area of the future position.

8. The method of claim 1, comprising:
estimating a future position of the vehicle in the parking garage, in particular depending on vehicle information; and
transmitting the future position to a parking garage management system, wherein the notice is transmitted to the vehicle when the elevator is in the area of the future position, and/or the potential appearance of the living creature is expected in the area of the future position.

9. The method of claim 1, comprising:
monitoring a motion detector located on a level of the parking garage on which the vehicle is currently located and/or is to be expected in the future.

10. A method for recognizing a potential collision of a vehicle with a living creature, comprising:
monitoring at least one operating state of at least one opening door of a parking garage in which the vehicle is located;
determining an opening of the opening door, in particular on a level on which the vehicle is currently located and/or is to be expected in the future, as a characteristic operating state of the opening door that characterizes a potential appearance of the living creature in the parking garage;
when the characteristic operating state is determined, conducting one or more of transmitting a notice to the vehicle, and changing an operating mode of the vehicle;
transmitting a current position of the vehicle to a parking garage management system;
transmitting the notice to the vehicle when the opening door is in an area of the current position, and/or the potential appearance of the living creature is expected in the area of the current position;
depending on the characteristic operating state of the opening door, estimating a point in time for a potential arrival of the living creature at the current position; and
depending on the operating mode of the vehicle, determining whether the vehicle will still be located in a collision-critical area around the current position at the estimated point in time, wherein the notice is then transmitted and/or the operating mode of the vehicle is changed if the vehicle would still be in this area at the estimated point in time.

11. The method of claim 10, comprising:
estimating a future position of the vehicle in the parking garage, in particular depending on vehicle information; and transmitting the future position to a parking garage management system, wherein the notice is transmitted to the vehicle when the opening door is in an area of the future position, and/or the potential appearance of the living creature is expected in the area of the future position.

12. The method of claim 10, comprising:
monitoring a motion detector located on a level of the parking garage on which the vehicle is currently located and/or is to be expected in the future.

13. The method of claim 10, comprising:
monitoring an occupancy sensor located in a parking zone on a level of the parking garage; and
recognizing an occupied signal currently being generated by this occupancy sensor as a characteristic operating state of the occupancy sensor, in particular on a level on which the vehicle is currently located and/or is to be expected in the future.

14. The method of claim 10, comprising:
detecting the living creature using a camera of the parking garage; and depending thereupon, transmitting the notice to the vehicle; and/or detecting the living creature by another vehicle in the parking garage, or detecting the characteristic operating state of the opening door of the parking garage by the another vehicle in the parking garage and, depending thereupon, transmitting the notice to the vehicle, and/or changing an operating mode of the vehicle.

15. A parking garage management system with a vehicle, wherein the parking garage management system is configured for:
monitoring at least one operating state of at least one opening door of a parking garage in which the vehicle is located;
determining an opening of the opening door, in particular on a level on which the vehicle is currently located and/or is to be expected in the future, as a characteristic operating state of the opening door that characterizes a potential appearance of a living creature in the parking garage;
when the characteristic operating state is determined, conducting one or more of transmitting a notice to the vehicle, and changing an operating mode of the vehicle;
transmitting a current position of the vehicle to a parking garage management system;
transmitting the notice to the vehicle when the opening door is in an area of the current position, and/or the potential appearance of the living creature is expected in the area of the current position;
depending on the characteristic operating state of the opening door, estimating a point in time for a potential arrival of the living creature at the current position; and
depending on the operating mode of the vehicle, determining whether the vehicle will still be located in a collision-critical area around the current position at the estimated point in time, wherein the notice is then transmitted and/or the operating mode of the vehicle is changed if the vehicle would still be in this area at the estimated point in time.

\* \* \* \* \*